May 8, 1945.     O. H. BASQUIN     2,375,209
TESTING DEVICE
Filed Nov. 4, 1943     2 Sheets-Sheet 1
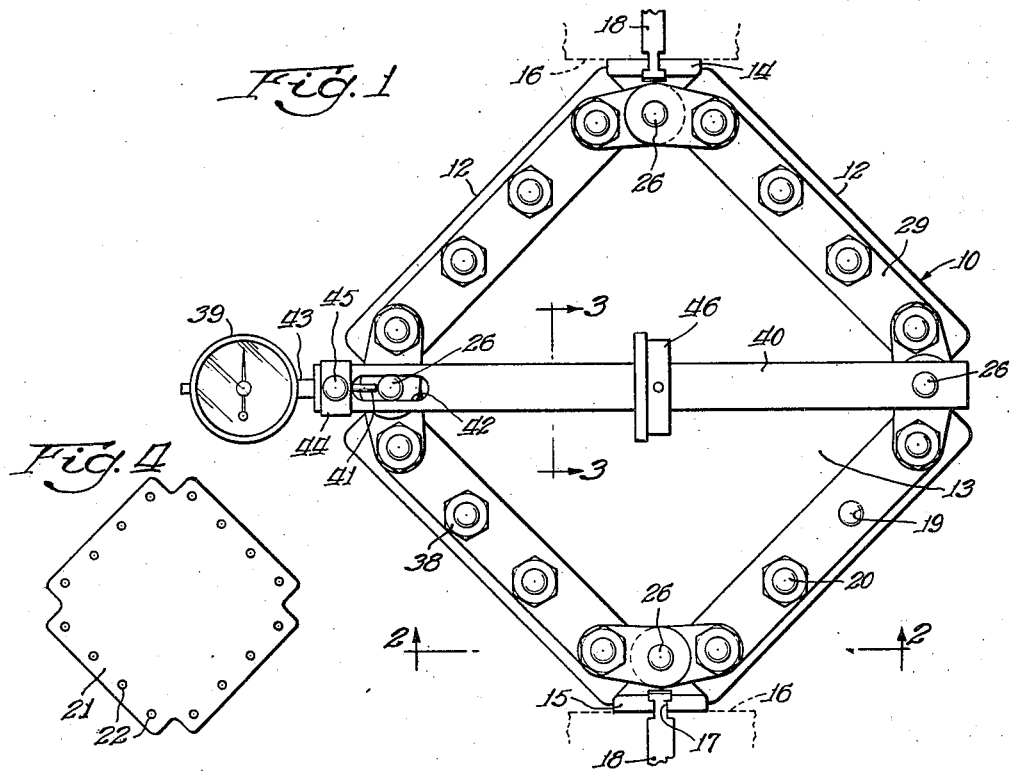
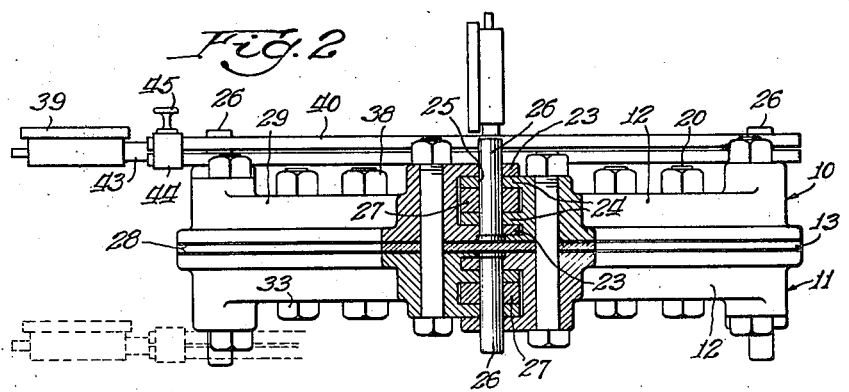
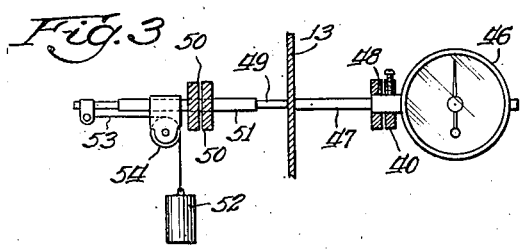
Inventor:
Olin H. Basquin May 8, 1945.   O. H. BASQUIN   2,375,209
TESTING DEVICE
Filed Nov. 4, 1943   2 Sheets-Sheet 2
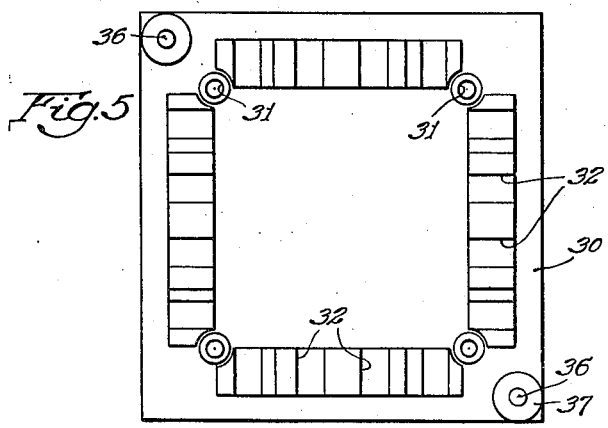
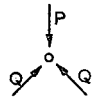
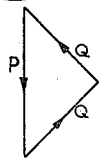
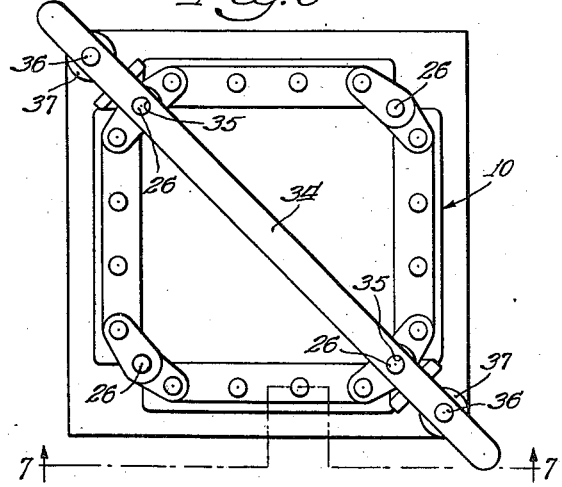
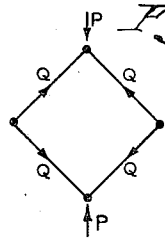
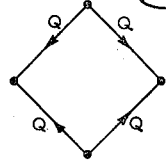
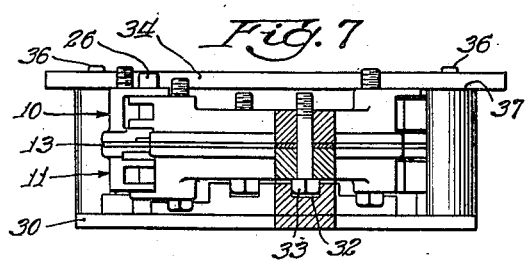
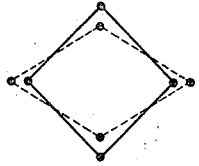
Inventor:
Olin H. Basquin
By: Roland C. Rehm
Atty.

Patented May 8, 1945

2,375,209

UNITED STATES PATENT OFFICE 2,375,209

TESTING DEVICE

Olin H. Basquin, Evanston, Ill., assignor to Streeter-Amet Company, Chicago, Ill., a corporation of Illinois Application November 4, 1943, Serial No. 508,874

14 Claims. (Cl. 73—102)

This invention relates to testing devices, and among other objects aims to provide a device for testing sheet material, such for example, as plywood, in shear.

The nature of the invention may be readily understood by reference to an illustrative device embodying the invention and shown in the accompanying drawings.

In said drawings:

Figure 1 is an elevation of the device in place in apparatus for applying force;

Fig. 2 is an edge view (partly in section) taken from the plane 2—2 of Fig. 1;

Fig. 3 is a fragmentary section taken on the plane 3—3 of Fig. 1 and showing the means for indicating the extent of buckling of the specimen under stress;

Fig. 4 is a plan view of a template for preparing accurate and uniform test specimens;

Fig. 5 is a plan view of a jig for use in assembling the testing device with a specimen;

Fig. 6 is a similar plan view of the jig with the testing device in place and illustrating the alignment of the pivots of the testing device;

Fig. 7 is an edge view of the assembly of Fig. 6 (partly in section) including a fragmentary section taken along the broken plane 7—7 of Fig. 6; and Figs. 8 to 12 are a series of diagrams useful in deriving from observed data, numerical values of properties of the material tested.

Plywood is now being put to numerous uses such as in aircraft which require better knowledge and understanding of its characteristics. The illustrative apparatus provides a simple means for easily, quickly, and inexpensively subjecting test specimens to shearing stress. It is characterized by a pair of frames 10 and 11 comprising links or elements 12 pivoted or hinged together at their ends and between which the specimen 13 is bolted or otherwise clamped. Each link of one frame has dimensions identical with those of the opposite link in the other frame, and in this case all the links have like dimensions. The device is adapted for use either with apparatus for applying compressive or tensile forces and these when applied diagonally of the frame transmit shearing stresses to the test specimen. Two opposite corners of the frame are equipped with fittings 14 and 15 which are adapted to rest between the faces 16 (shown in dotted lines, Fig. 1) of apparatus for applying compression. The fittings are provided with appropriate slots 17 in which may be inserted tension members 18 if the apparatus employed is adapted to apply tension.

Each of the links 12 of the respective frames is provided with a series of bolt holes 19 (each adapted to be aligned exactly with the bolt hole of the corresponding link of the opposite frame) through which bolts 20 may be passed to clamp the interventing specimen 13 in place.

The specimen is advantageously formed by the use of a template 21 (Fig. 4) by means of which not only the shape of the specimen may be determined, but the bolt holes may be exactly located. For this purpose the template is provided with a series of holes 22 having exactly the spacing of the holes in the corresponding links 12 of the respective frames. The corners of the specimen are preferably cut away as shown in Fig. 4 so as not to interfere with the application of force to the specimen or the transmission of force to the specimen. The ends of each of the links are bifurcated to provide a plurality of interfitting hinge elements 23 and 24 having registering openings 25 through which the hinge or pivot pins 26 pass. The bearing portions 27 of the respective fittings 14 and 15 is located between the inner pairs 24 of the hinge elements. The hinged elements thus form a pair of frames hinged at their corners by means of the hinge pins 26. The inner edge of each of the links is straight and substantially in alignment with the axes of its two hinge pins. The effective area of the specimen tested is therefore the square defined by the inner edges of the links and the hinge pin axes. The inner faces 28 of the elements of each of the frames are flat so as to provide bearing surfaces for the specimen. The links are thickened as at 29 along the line of bolt holes so as to stiffen the links against substantial deflection under load.

To facilitate assembly with a specimen and also to insure exact axial alignment of the respective hinge pins 26, a jig 30 is advantageously employed. The jig is rectangular (in this case square) in shape and provided with holes 31 at the corners for receiving the projecting ends of the pivot pins 26 of the lower frame. The jig is also advantageously equipped with a series of recesses or slots 32 in which the bolt heads 33 are fitted to prevent turning when the nuts are applied after assembly. After location of the lower frame a specimen 13 is slipped over the projecting bolt ends and the opposite frame is then slipped over the bolts. The pivots 26 of the latter frame are aligned by means of a bar 34 having accurately located holes 35 therein adapted to pass over the projecting ends of a diagonally opposite pair of pivot pins 26. The holes 35 are accurately located in line with the axis of the pivot pins of the underlying frame by means of studs 36 carried by the jig. The studs 36 are shouldered as at 37 to provide a seat for the bar 34. Thereafter the nuts 38 are applied and drawn tight.

To insure application of uniform shearing stress by minimizing local movement of the specimen in the frames, the gripping friction of the inner frame faces 28 is augmented appropriately as by facing them with emery cloth glued thereto by a cellulose lacquer adhesive or other setting glue which will hold the emery cloth against movement. The heads of the hinge pins in contact with the specimen are also similarly faced.

The means for indicating strain in the specimen is here shown in the form of a so-called Ames dial 39 supported and held by a bearing 40 connected to one hinge pin, the spindle 41 of the Ames dial bearing against the diagonally opposite hinge pin. Adjacent the latter hinge pin the bar is slotted as at 42 to allow movement of the pin therein. Elongation or contraction of the diagonal between the hinge pins is therefore indicated by the Ames dial, as presently explained. This provides a means for determining the shearing strain and shearing modulus of the specimen. In the present instance bar 40 is made in two parts and recessed at its end so as to fit around the shank 43 of the Ames dial. These parts are held together by a surrounding clamp 44 provided with a tightening thumb screw 45.

The method of assembly of the frames on a specimen together with the circumstance that the hinges are alike and the axes of the pivots of the respective frames are in alignment, insures the application of substantially pure shearing stresses to the specimen. This is true whether the testing apparatus applies compression or tension at the fittings 14 and 15.

Buckling of the specimen under stress is indicated in this instance by another Ames dial 46 whose spindle 47 bears perpendicularly against the approximate center of the specimen (see Fig. 3). The dial is clamped between the two members comprising the bar 40 which are recessed as indicated at 48 (Fig. 3) for this purpose. The deflecting action of the pressure of the spindle 47 against the specimen is appropriately counter-balanced, in this instance, by a plunger 49 bearing against the opposite face of the specimen at a point exactly opposite the end of the spindle. The plunger is mounted between a pair of bars 50 similar to bar 40 and mounted on diagonally opposite hinge pins 26 of the opposite frame. Plunger 49 is slidable in a sleeve 51 carried between bars 50 and is pressed toward the specimen by a force equal to that exerted by spindle 47 by means of a weight 52 connected by a flexible line 53 with the end of the plunger 49. As here shown, the pull of the weight 52 is transmitted longitudinally of the plunger 49 by passing the flexible cord over a pulley 54 connected to a sleeve 51.

Figs. 8 to 11 illustrate diagrammatically the direction and relative magnitude of the force involved in the use of the apparatus.

In Fig. 8 the vertical force P represents the load that is applied by the testing machine or other force applying apparatus to the upper hinge pins of the frame within which the specimen is clamped and the lines Q, Q represent the forces with which the upper links press or react against the same hinge pins. If the testing machine applies tension instead of compression, the direction of the arrows in the above as well as the following diagrams would be reversed. Since these three forces are in equilibrium their magnitudes are propositional to the lengths of the corresponding lines in Fig. 9. The forces which act both upon the upper and the lower hinge pins are indicated in Fig. 10. The magnitude of the forces P will, of course, be indicated by the testing machine. Since the specimen is a square the magnitude of the forces Q would be represented by the sides of a right triangle wherein the force P corresponded to the hypotenuse. All the forces in Fig. 10 act upon the hinge pins. Fig. 11 is similar to 10, but represents the forces by which the several links of the framework act upon the four effective marginal edges of the specimen to which the links are clamped. These forces are all equal; thus, if the specimen is uniform, it would be subjected to substantially uniform shearing stress throughout the entire free area enclosed by the links. If P represents the load in pounds, $t$ represents the thickness of the specimen in inches, and $d$ represents the length of a diagonal between the axes of the hinge pins in inches, then the numerical value of this substantially uniform shear stress is $$\frac{P}{td}$$

in pounds per square inch. If the load be continued and augmented until fracture of the specimen takes place, the above relation does not strictly hold true for the extreme conditions represented by fracture, but such refinements may be overlooked in practical use of the apparatus and the above relationship applied even for maximum load.

In Fig. 12 the solid lines represent the square of the framework or effective area of the specimen at the beginning of the test and the dotted lines represent in exaggerated form the diamond shape which the frame and specimen assume upon application of the load P. If $e$ represents the change in length of one of the diagonals of the square as distorted in Fig. 12 in inches, the corresponding shear strain is $$2\frac{e}{d}$$

The shear stress is $$\frac{P}{td}$$

The shear modulus of elasticity is the ratio of shearing stress to shearing strain, or $$\frac{P}{2et}$$

represented in pounds per square inch.

Obviously the invention is not limited to the details of the illustrative apparatus and its manner of use as well since they may be variously modified. Moreover, it is not indispensable that all of the features of the invention be used conjointly since various features may be used to advantage in different combinations and sub-combinations.

Having described my invention, I claim:

1. Testing apparatus for applying shear to sheet material comprising in combination a pair of equal quadrilateral frames the sides of which are hinged at their corners, means for clamping the frames together on opposite sides of a specimen to be tested, and means for applying a force at corners of the assembled frames and directed diagonally thereof.

2. Testing apparatus for applying shear to sheet material comprising in combination a pair of quadrilateral frames having equal sides hinged together at their ends, means for clamping the frames together on opposite sides of a specimen to be tested with the axes of the hinges of one frame exactly in alignment with the axes of the opposite hinges of the other frame, and means for applying force to a pair of diagonal corners of the assembled frames to apply shear stress to the said specimen.

3. Testing apparatus for applying shear to sheet material comprising in combination a pair of quadrilateral frames having equal sides hinged together at their ends, means for clamping the frames together on opposite sides of a specimen to be tested with the axes of the hinges of one frame exactly in alignment with the axes of the opposite hinges of the other frame, and means for measuring change in length of a diagonal of said frames.

4. In testing apparatus comprising a pair of frames whose sides are pivoted together at their ends by pivot pins, a jig for applying said frames to opposite sides of a test specimen, said jig comprising in combination a plate having pivot pin recesses at the corners of a square whose sides correspond with the sides of a frame, said recesses being adapted to receive and center the pivot pins of one of said frames, a bar extending diagonally of said square and having recesses therein adapted to register with the axes of a diagonally opposite pair of recesses in said frame, means carried by said plate for holding said bar spaced above said plate with the recesses in said bar in axial alignment with the aforesaid diagonal recesses in said plate, whereby the pivot pins of the other frame may be axially aligned with the pivot pins of the first named frame.

5. In testing apparatus comprising a pair of frames whose sides are pivoted together at their ends by pivot pins, a jig for applying said frames to opposite sides of a test specimen, said jig comprising in combination a plate having pivot pin recesses at the corners of a square whose sides correspond with the sides of a frame, said recesses being adapted to receive and center the pivot pins of one of said frames, a bar extending diagonally of said square and having recesses therein adapted to register with the axes of a diagonally opposite pair of recesses in said frame, means carried by said plate for holding said bar spaced above said plate with the recesses in said bar in axial alignment with the aforesaid diagonal recesses in said plate, whereby the pivot pins of the other frame may be axially aligned with the pivot pins of the first named frame said plate having a plurality of seats for clamping bolts passing through said frames and specimen whereby the specimen may be accurately located between said frames.

6. Testing apparatus for applying shear to sheet material comprising in combination a pair of equal quadrilateral frames, said frames having sides with straight inner edges and ends with pivot holes whose axes are substantially in alignment with said sides, pivot pins passing through adjacent sides of each frame to hinge the sides together, means for clamping the frames together on opposite sides of a specimen to be tested, and means for applying a force at the corners of the assembled frames and directed diagonally thereof.

7. Testing apparatus for applying shear to sheet material comprising in combination a pair of equal quadrilateral frames, said frames having sides with straight inner edges and ends with pivot holes whose axes are substantially in alignment with said sides, pivot pins passing through adjacent sides of each frame to hinge the sides together, means for clamping the frames together on opposite sides of a specimen to be tested, means for applying a force at the corners of the assembled frames and directed diagonally thereof, and means for measuring the change in length of a diagonal of said frames under the force applied to said frames.

8. Testing apparatus for applying shear to sheet material comprising in combination a pair of equal quadrilateral frames the sides of which are hinged at their corners, means for clamping the frames together at opposite sides of a specimen to be tested, means for applying a force at corners of the assembled frames and directed diagonally thereof, and means for measuring the lateral deflection of said specimen under the force applied to said frames.

9. Testing apparatus for applying shear to sheet material comprising in combination a pair of equal quadrilateral frames the sides of which are hinged at their corners, means for clamping the frames together on opposite sides of a specimen to be tested, means for applying a force at corners of the assembled frames and directed diagonally thereof, means for measuring the elongation of a diagonal of said frame under force applied thereto, and separate means for simultaneously measuring the lateral deflection of a specimen under said force.

10. Testing apparatus for applying shear to sheet material comprising in combination a pair of equal quadrilateral frames the sides of which are hinged at their corners, means for clamping the frames together on opposite sides of a specimen to be tested, means for applying a force at corners of the assembled frames and directed diagonally thereof, a measuring device bearing against the face of a specimen to measure the lateral deflection thereof under stress, and means for engaging the other face of the specimen opposite said measuring means to counterbalance the pressure of said measuring means against the specimen.

11. Testing apparatus for applying shear to sheet material comprising in combination a pair of equal quadrilateral frames, said frames having sides with straight inner edges and ends with pivot holes whose axes are substantially in alignment with said sides, pivot pins passing through adjacent sides of each frame to hinge the sides together, means for clamping the frames together on opposite sides of a specimen to be tested, and bearing fittings engaging a pair of diagonally opposite pivot pins for transmitting externally applied force to said frames and thereby to said specimen.

12. Testing apparatus for applying shear to sheet material comprising in combination a pair of equal quadrilateral frames, said frames having sides with straight inner edges and ends with pivot holes whose axes are substantially in alignment with said sides, pivot pins passing through adjacent sides of each frame to hinge the sides together, means for clamping the frames together on opposite sides of a specimen to be tested, and bearing fittings engaging a pair of diagonally opposite pivot pins for transmitting externally applied force to said frames and thereby to said specimen, said fittings being provided with means for removably connecting tension members thereto for applying external tension at opposite corners of said frames.

13. Testing apparatus for applying shear to sheet material comprising in combination a pair of quadrilateral frames having equal sides hinged together at their ends, means for clamping the frames on opposite sides of a specimen to be tested with the axes of the hinges of one frame exactly in alignment with the axes of the opposite hinges of the other frame, a bar connected to a hinge at one corner of the frame and carrying a measuring device, said measuring device having a spindle engaging the diagonally opposite hinge and adapted to measure relative movement between said diagonally opposite frame hinges.

14. Testing apparatus for applying shear to sheet material comprising in combination a pair of equal quadrilateral frames, said frames having sides with straight inner edges and ends with pivot holes whose axes are substantially in alignment with said sides, pivot pins passing through adjacent sides of each frame to hinge the sides together, means for clamping the frames together on opposite sides of a specimen to be tested, said sides having friction surfaces in contact with said specimen to minimize local movements of the specimen in said frames, and means for applying a force at a corner of the assembled frames and directed diagonally thereof.

OLIN H. BASQUIN.